(12) United States Patent
Griswold et al.

(10) Patent No.: US 9,319,236 B2
(45) Date of Patent: Apr. 19, 2016

(54) OPTICAL LINE TERMINAL (OLT) SYSTEM

(71) Applicant: Broadcom Corporation, Irvine, CA (US)

(72) Inventors: Mark Griswold, Fremont, CA (US); Ryan Hirth, Windsor, CA (US)

(73) Assignee: Broadcom Corporation, Irvine, CA (US)

( * ) Notice: Subject to any disclaimer, the term of this patent is extended or adjusted under 35 U.S.C. 154(b) by 691 days.

(21) Appl. No.: 13/627,795

(22) Filed: Sep. 26, 2012

(65) Prior Publication Data

US 2014/0086580 A1  Mar. 27, 2014

(51) Int. Cl.
*H04L 12/46* (2006.01)
*H04Q 11/00* (2006.01)
*H04L 12/28* (2006.01)

(52) U.S. Cl.
CPC ........ *H04L 12/2872* (2013.01); *H04L 12/4633* (2013.01); *H04Q 11/0067* (2013.01); *H04Q 2011/0086* (2013.01)

(58) Field of Classification Search
CPC ........... H04L 12/4633; H04Q 11/0067; H04Q 2011/0086; H04Q 2011/0077; H04Q 2011/0073
See application file for complete search history.

(56) References Cited

U.S. PATENT DOCUMENTS

| | | | |
|---|---|---|---|
| 7,492,768 B2 * | 2/2009 | Yoon et al. | 370/392 |
| 7,577,136 B1 * | 8/2009 | Devanagondi et al. | 370/389 |
| 7,826,378 B2 | 11/2010 | Absillis et al. | |
| 2003/0117998 A1 * | 6/2003 | Sala et al. | 370/351 |
| 2004/0109450 A1 * | 6/2004 | Kang et al. | 370/390 |
| 2004/0114592 A1 * | 6/2004 | Kang et al. | 370/389 |
| 2005/0058118 A1 * | 3/2005 | Davis et al. | 370/351 |
| 2008/0002976 A1 * | 1/2008 | Tal et al. | 398/58 |
| 2011/0182588 A1 | 7/2011 | Wojtowicz | |
| 2011/0188857 A1 * | 8/2011 | Zheng | 398/45 |

(Continued)

FOREIGN PATENT DOCUMENTS

WO   WO-2007099045 A1   9/2007

OTHER PUBLICATIONS

"EPON Technology White Paper", GW Technologies Co., Ltd., last viewed Jan. 23, 2013, retrieved from <http://www.argo-contar.com/solutions/EPON%20Technology%20White%20Paper.pdf>.

(Continued)

*Primary Examiner* — Noel Beharry
*Assistant Examiner* — Raza Ansari
(74) *Attorney, Agent, or Firm* — McDermott Will & Emery LLP

(57) ABSTRACT

An optical line terminal (OLT) system for a passive optical network (PON) may include a processor, an OLT Medium Access Control (MAC) device communicatively coupled to PON ports, and a switch device communicatively coupled to the OLT MAC device via an Ethernet interface. The processor may map logical identifiers of each PON port to tunnel identifiers, where each tunnel identifier is indicative of a logical identifier and its corresponding PON port. The OLT MAC device may receive upstream data items that include logical identifiers over the PON ports. The OLT MAC device may replace the logical identifier of each upstream data item with the tunnel identifier that is mapped to the logical identifier and the PON port over which the upstream data item was received. The OLT MAC device may transmit, over the Ethernet interface to the switch device, the upstream data items including the tunnel identifiers.

20 Claims, 7 Drawing Sheets

(56) References Cited

U.S. PATENT DOCUMENTS

2011/0200331 A1* 8/2011 Li .................... H04L 12/56
398/45
2012/0099861 A1 4/2012 Zheng

OTHER PUBLICATIONS

"10G EPON—Unleashing the Bandwidth Potential", ZTE Corporation, 2009.
Kramer, "On Configuring Logical Links in EPON", last viewed Jan. 23, 2013, retrieved from <http://glenkramer.com/ucdavis/papers/llid_config.pdf>.
"Optical line termination", Wikipedia—The Free Encyclopedia, last viewed Jul. 12, 2012, retrieved from <http://en.wikipedia.org/w/index.php?title=Optical_line_termination&printable=yes>.
"Ethernet Passive Optical Network (EPON) Tutorial", Ethernet in the First Mile Alliance, Jun. 2004.
Miyazaki, et al., "MAC LSI Design Technology for Optical Access Communication", NTT Technical Review, Mar. 2011, vol. 9, No. 3.
"White Paper—Custom NPUs for Broadband Access Line Cards", Altera—Ethernity Networks, Dec. 2007, Version 1.0.
Lallukka, et al., "Passive Optical Networks—Transport Concepts", VTT Publications 597, 2006.
"Ethernet in the First Mile—Frequently Asked Questions", last viewed Jul. 12, 2012, retrieved from <http://www.ethernetinthefirstmile.com/faq_pon.html>.
"Fiber to the x", Wikipedia—The Free Encyclopedia, last viewed Jul. 12, 2012, retrieved from <http://en.wikipedia.org/w/index.php?title=Fiber_to_the_x&printable=yes>.
"Implementing Next-Generation Passive Optical Network Designs with FPGAs", Altera Corporation, May 2012.
"Operating the EPON protocol over Coaxial Distribution Networks Call for Interest", IEEE 802.3 Ethernet Working Group, Nov. 8, 2011.
Smith, "Communications Processors vs. Network Processors: Programmable Data Plane Approaches", RTC Magazine, last viewed Jul. 25, 2012, retrieved from <http://www.rtcmagazine.com/articles/print_article/100479>.
Khermosh, "Managed Objects of Ethernet Passive Optical Networks (EPON)", PMC-SIERRA, Jul. 2007.
Kramer, et al., "8—Ethernet Passive Optical Network (EPON)", last viewed Jan. 23, 2013, retrieved from <http://users.encs.concordia.ca/~assi/courses/encs6811/epon_wiley.pdf>.
"Smooth Evolution of EPON to 10G EPON", ZTE Technologies, Jan. 12, 2010, retrieved from <http://wwwen.zte.com/endata/magazine/ztetechnologies/2009year/no9/articles/.../t20100112_179553.html>.
"Passive optical network," Wikipedia—The Free Encyclopedia, last viewed Jul. 12, 2012, retrieved from <http://en.wikipedia.org/w/index.php?title=Passive_optical_network&printable=yes>.

\* cited by examiner

OPTICAL LINE TERMINAL (OLT) SYSTEM

TECHNICAL FIELD

The present description relates generally to an optical line terminal system, and more particularly, but not exclusively, to an optical line terminal system for a passive optical network.

BACKGROUND

Passive Optical Networks (PONs), such as Ethernet Passive Optical Networks (EPONs), are increasingly being deployed to satisfy the growth in residential and commercial demand for bandwidth intensive services, e.g. broadband internet access. An EPON generally consists of an optical line terminal (OLT) system in a central office and multiple optical network units (ONUs) in the field, that are all connected by a passive optical connection. The ONUs may couple customer equipment of one or more residential or commercial subscribers to the EPON, such that the subscribers may receive bandwidth intensive services, while the OLT equipment may provide flow classification, modification, and quality of service functions for the entire EPON.

In one or more instances, the OLT system may be coupled to a backplane or other uplink, such as through an Internet Service Provider (ISP). The ONUs may be associated with at least one 15-bit logical link identifier (LLID) that may be included in the data packets that are transmitted between the ONUs and the OLT system, such that, e.g., data traffic transmitted to/from the ONUs can be differentiated. The OLT system may require a number of resources to handle functions associated with the LLIDs, such as dynamic bandwidth allocation (DBA), scheduling, deep packet buffering, etc. In one or more OLT systems, switching functionality and OLT Medium Access Control (MAC) functionality may be provided in a single line card, or a single OLT device, e.g. an integrated circuit (IC), and may support data rates of up to 1 Gbit/s (1 G). In one or more implementations, the switching functionality of the OLT system may be provided by a network processor.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1:
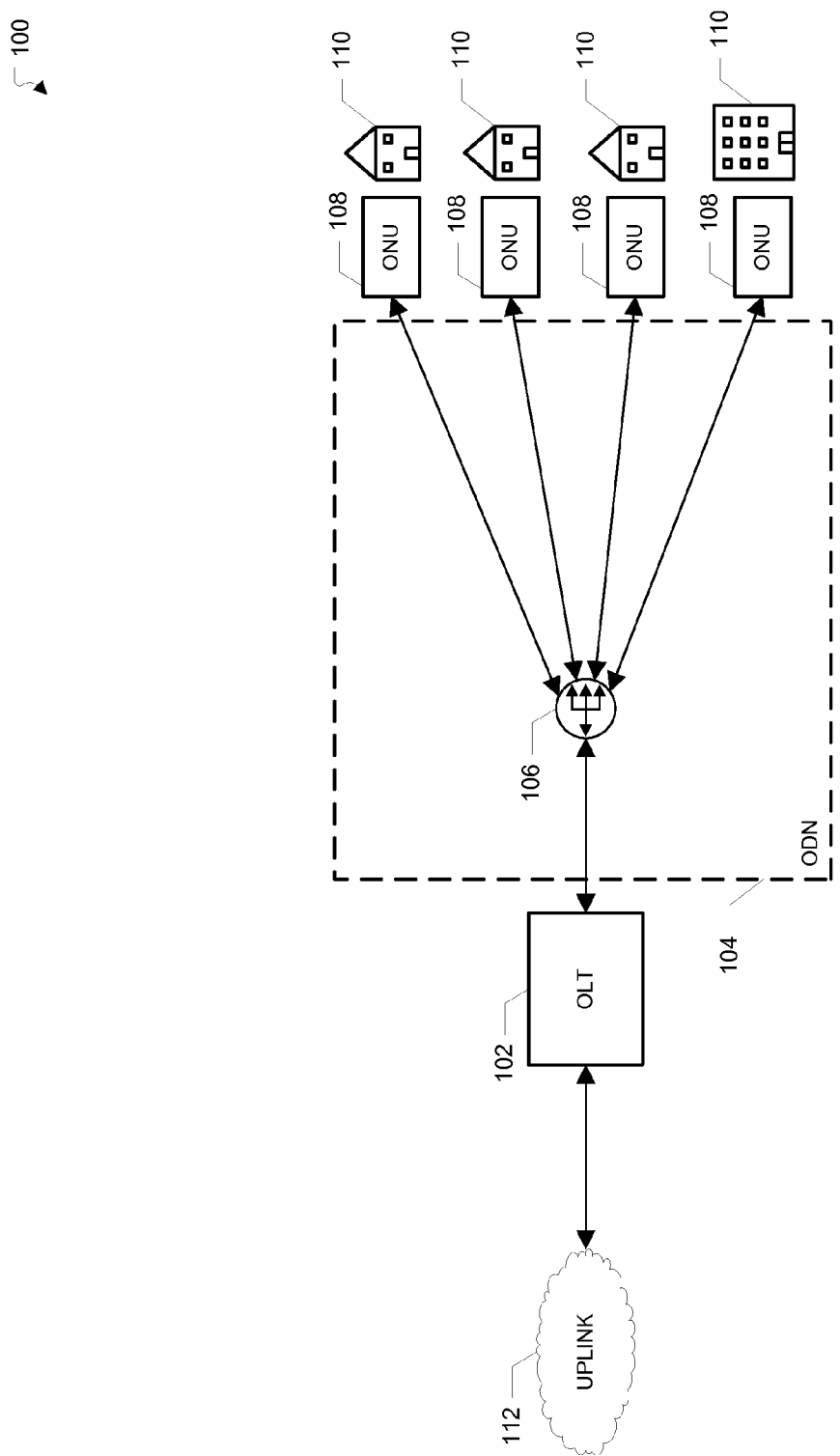
FIG. 1 illustrates an example network environment in which an optical line terminal system may be implemented in accordance with one or more implementations.

FIG. 1 illustrates an example network environment 100 in which an optical line terminal system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 100 may include a passive optical network environment (PON), such as an Ethernet passive optical network (EPON), a gigabit passive optical network (GPON), or generally any PON. The network environment 100 may include an optical line terminal (OLT) 102, at least one optical distribution network (ODN) 104, one or more optical network units (ONUs) 108, an uplink 112, and customer premises 110. The ODN 104 may include optical fibers, one or more optical splitters 106, such as passive optical splitters, and/or other optical routing devices. The optical splitters 106 may split an downstream optical signal such that effectively the same downstream signal is transmitted to the ONUs 108. The ODN 104 may include, but is not limited to, any loop-free network topology.

The ONUs 108 may be located at, or within several miles of, the customer premises 110. The ONUs 108 may transform incoming optical signals from the OLT 102 into electrical signals that are used by networking and/or computing equipment at the customer premises 110. An ONU 108 may service a single customer or multiple customers at the customer premises 110. Since the ONUs 108 receives the same downstream signal, an ONU 108 may be associated with at least one 15-bit logical link identifier (LLID) that is included in data packets transmitted between the ONUs 108 and the OLT 102, such that data traffic transmitted to/from the ONUs 108 can be differentiated. In one example, a customer that is receiving service from an ONU 108 may be associated with one or more LLIDs. In this example, the LLID of a customer may be included in data traffic of the customer that is transmitted to/from the ONU 108 and the OLT 102.

The customer premises 110 may be representative of at least a portion of one or more residential or commercial properties that are connected to the uplink 112 through the ONUs 108, the ODN 104, and the OLT 102. A customer premises 110 may include one or more electronic devices, such as laptop or desktop computers, smartphones, personal digital assistants ("PDAs"), portable media players, set-top boxes, tablet computers, televisions or other displays with one or more processors coupled thereto and/or embedded therein, and/or any other devices that include, or are coupled to, a network interface. A customer premises 110 may also be associated with, and/or may include, networking devices, such as routers, switches, and/or any other networking devices, that may interface with an ONU 108. In one example, one or more of the networking devices associated with a customer premises 110 may interface with an ONU 108 externally to the customer premises 110, such as several miles from the customer premises 110. In this example, the external networking devices may be connected to the customer premises 110 via copper technologies, such as wired Ethernet.

The uplink 112 may be a public communication network (such as the Internet, cellular data network, dialup modems over a telephone network) or a private communications network (such as private local area network ("LAN"), leased lines). The uplink 112 may also include, but is not limited to, any one or more of the following network topologies, including a bus network, a star network, a ring network, a mesh network, a star-bus network, a tree or hierarchical network, and the like. The uplink 112 may be connected to the OLT 102 via a network-to-network interface (NNI).

The OLT 102 may be located in a central office, such as a central office of a service provider. The OLT 102 provides an interface between the ONUs 108 and the uplink 112, such as by transforming between the optical signals used by the ONUs 108 and the electrical signals used by the uplink 112. The OLT 102 may support multiple upstream and downstream data rates, such as 1 gigabit per second (1G), 10 gigabits per second (10G), and/or any other transmission rates. The OLT 102 may include an OLT MAC device that performs OLT specific tasks, such as EPON interface functions, e.g. EPON MAC, EPON diagnostic functions, and/or EPON upstream bandwidth scheduling, and a switch device that performs switching tasks of the OLT 102, such as flow classification, packet forwarding, and/or packet modification. The OLT MAC device and the switch device may be separate devices, e.g. separate integrated circuits (ICs), separate pluggable modules, and/or separate line cards, that communicate over a standard Ethernet interface.

Partitioning the OLT 102 into two separate devices, e.g. the switch device and the OLT MAC device, may, in one or more implementations, increase the power envelope and area available to the OLT 102 relative to OLT systems that implement the switch functions and OLT MAC functions in a single device. Furthermore, partitioning the OLT 102 may allow for greater scalability both in the number of OLT ports that can be handled by the OLT 102, as well as the number of LLIDs that can be supported by OLT 102. The scalability of the OLT 102 may be desirable for systems transitioning to 10G, which may require an increase in the number of allocated LLIDs (due to an increase in subscribers using the additional bandwidth provided by 10G), in addition to an increase, for 10G implementations, in the amount of resources required in the OLT 102 to handle the aforementioned functions associated with the LLIDs, e.g. DBA, scheduling, deep packet buffering etc. Thus, the partitioning of the OLT 102 may allow the OLT 102 to provide the number of LLIDs and associated resources that may be necessary for 10G implementations, while remaining within existing power envelope and area constraints.

In addition, by partitioning the switching functionality from the EPON-specific functionality, the switch device of the OLT 102 can benefit from optimizations in switching technology (both in packet processing and traffic management) that may be driven by the entire switching market, rather than the only the OLT specific segment of the switching market, and the switch device of the OLT 102 may also utilize a packet processor rather than the network processor, which may result in a reduction in power consumption in one or more implementations. Furthermore, partitioning the switching functionality may also allow customers to implement the OLT 102 using different switch hardware configurations depending upon their particular implementation needs. For example, a customer may implement the OLT 102 using a switch that performs deep packet buffering for upstream data, which may provide the most granular quality of service (QoS) if the upstream network-to-network (NNI) interface is a congestion point, or using a switch that does not perform deep packet buffering for upstream data, which may reduce the number of dynamic random-access memory (DRAM) components of the switch device and/or the system power used by the switch device.

In one or more implementations, the uplink 112 may be, or may include, a connection to a second switch device in the same network node as the OLT 102, e.g. the switch device and OLT MAC device of the OLT 102 may be on a line card of a chassis, and the second switch device may be on an uplink card or other central switching card of the chassis. The second switch device may be connected to the public communication network. In these one or more implementations, a high level of oversubscription may be provided between the connected ODNs 104 and the public communication network.

Figure 2:
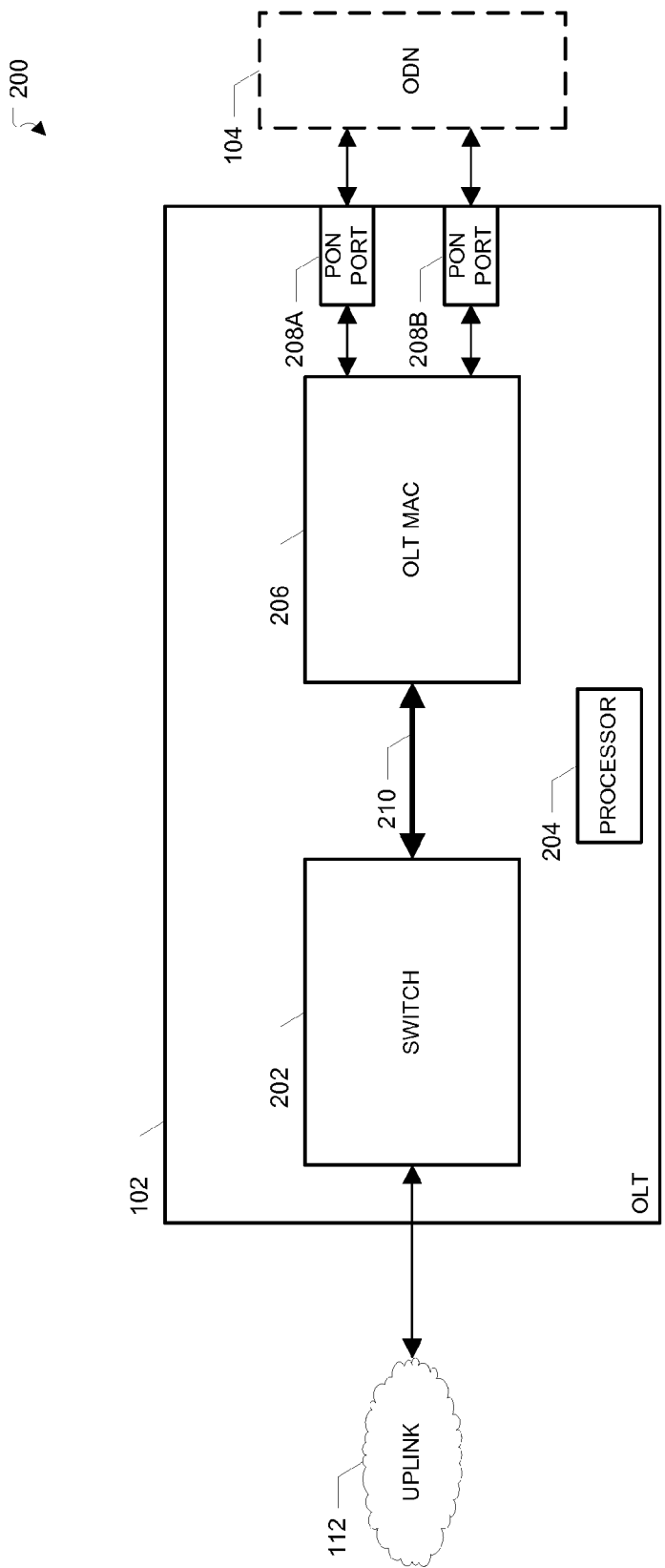
FIG. 2 illustrates an example network environment in which an optical line terminal system may be implemented in accordance with one or more implementations.

FIG. 2 illustrates an example network environment 200 in which an example optical line terminal system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The network environment 200 may include a passive optical network environment (PON), such as an Ethernet passive optical network (EPON), a gigabit passive optical network (GPON), or generally any PON. The network environment 200 includes an uplink 112, an OLT 102, and an ODN 104. The OLT 102 includes one or more processors 204, such as line card processors, host processors, or generally any other processors, one or more switch devices 202, one or more OLT MAC devices 206, one or more interfaces 210 between the one or more switch devices 202 and the one or more OLT MAC devices 206, and one or more PON ports 208A-B. The switch device 202 and OLT MAC device 206 may be separate integrated circuits (ICs), separate pluggable modules, and/or separate line cards.

The OLT MAC device 206 may include memory, such as buffers, and a processor. The OLT MAC device 206 may handle tasks specific to the OLT implementation, such as EPON interface functions, EPON upstream bandwidth scheduling towards the switch device 202 with multiple levels of hierarchy, EPON diagnostic functions, and termination of EPON discovery and operations, administration and maintenance (OAM) traffic. The OLT MAC device 206 may be, for example, a flow-through device that does not perform any buffering other than burst management. The OLT MAC device 206 may be an EPON MAC device, a GPON MAC device, a mixed-function EPON/GPON device, or generally may perform OLT functionality associated with any passive optical network.

The switch device 202 may include memory, such as buffers, and a packet processor, a network processor, or a general purpose processor, or generally any processor. The switch device 202 may handle the switching functionality for the OLT 102, such as flow classification, packet forwarding, packet modification, per flow queuing with deep packet buffer, and downstream bandwidth scheduling with multiple levels of hierarchy. In addition, the switch device 202 may also perform any other switching functions, such as participating in the IEEE 1588 precision time protocol. In one example, the switch device 202 may also include a multi-level upstream scheduler that schedules from the switch device 202 to the uplink 112. In this example the bandwidth of the EPON, and the upstream bandwidth, may be utilized as efficiently as possible since the switch device 202 can use its uplink scheduler to schedule traffic in an oversubscribed uplink scenario. In one example, the switch device 202 may be attached to multiple OLT MAC devices 206, such as an EPON OLT MAC device, and a GPON OLT MAC device, through separate interfaces 210, such as Ethernet interfaces, that are implemented as described herein.

The interface 210 between the switch device 202 and the OLT MAC device 206 may be an Ethernet interface, or generally any interface capable of transmitting signals between separate ICs and/or separate devices. The interface 210 may be direct-mapped to an EPON optical fiber, or a set of EPON optical fibers, with throughput that can be contained within the interface 210. The OLT 102 may also include an inband management channel across the interface 210 between the devices that may allow communication between the internal central processing units (CPUs) of the switch device 202 and the OLT MAC device 206, and/or one or more of the processors 204, such as the host CPU, and/or a remote management CPU in the chassis hosting the devices 202, 206.

In order to facilitate communication between the switch device 202 and the OLT MAC device 206 over the interface 210, the LLIDs of the PON ports 208A-B may be indirectly mapped to a 12-bit tunnel identifier (ID) that may be included in data items, such as packets, frames, or any segmented data items, that are transmitted over the interface 210 between the switch device 202 and the OLT MAC device 206, such as in an outer VLAN tag. In this manner, the switch device 202 and the OLT MAC device 206 can access the tunnel ID to identify the PON port 208A-B and LLID corresponding to any transmitted packet. For example, a 15-bit LLID may be mapped into an LLID index, and the LLID index may be combined with an identifier of the PON port 208A corresponding to the LLID, to generate the tunnel ID. Thus, the tunnel ID identifies the PON port 208A and indirectly identifies the LLID, e.g. through the LLID index. The format of the tunnel ID is discussed further below with respect to FIG. 6.

Since the tunnel ID includes an identifier for the corresponding PON port 208A, the tunnel ID may provide for the co-existence of 10G and 1G PON ports 208A-B on the same ODN 104. Thus, any PON port 208A-B may be designated as handling data transmitted at a specified transmission rate, such as 1G, 10G, or generally any transmission rate. In one instance, OLT 102 may include two PON ports 208A-B, one of which is designated as a 1G port, and one of which is designated as a 10G port. In another instance, OLT 102 may include multiple PON ports 208A-B designated as 1G ports, such as eight PON ports 208A-B designated as 1G ports.

For example, in an OLT 102 supporting 10G-1G coexistence, e.g. one PON port 208A designated as a 1G PON and one PON port 208B designated as a 10G PON port, the tunnel ID may include a one-bit identifier that identifies whether the LLID index of the tunnel ID corresponds to the PON port 208A designated as 1G or the PON port 208B designated as 10G. In this manner, the OLT 102 may distinguish between the LLIDs of the 1G and 10G PON ports 208A-B, and therefore may allocate fewer LLID resources for the 1G LLIDs, since fewer resources are required by the 1G LLIDs relative to the 10G LLIDs. In addition, the remaining 11-bits of the tunnel ID may be allocated to the LLID index, which may provide for 2048 separate LLIDs for both the PON port 208A designated as 1G and the PON port 208B designated as 10G, although only a small number of the LLIDs may be usable by the PON port 208A designated as 1G.

The use of the tunnel ID to indirectly encode the LLIDs may avoid fragmentation of the LLID namespace since the tunnel IDs are manageable and can be arbitrarily assigned. In other words, even if customers control the LLIDs that are being used, the mapping between the LLIDs and the tunnel IDs will still exist. In addition, the tunnel ID avoids the need for the switch device 202 to change its handle, or mapping, for an LLID after it is allocated, which may be desirable since the LLID may be available to both the switch device 202 and the application software controlling the switch device 202, such as through the tunnel ID.

Figure 3:
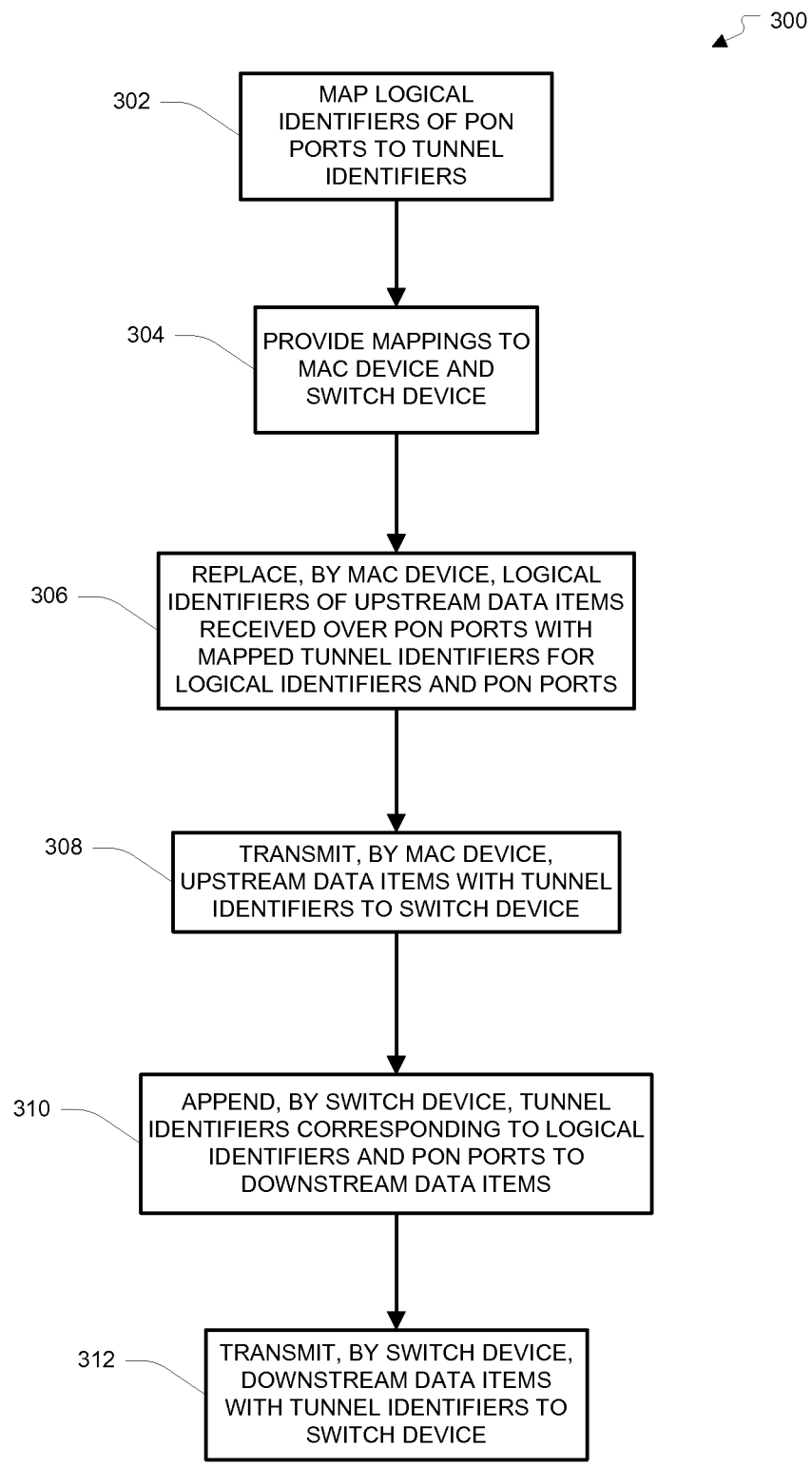
FIG. 3 illustrates a flow diagram of an example process in an optical line terminal system in accordance with one or more implementations.

FIG. 3 illustrates a flow diagram of an example process 300 in an optical line terminal system in accordance with one or more implementations. For explanatory purposes, example process 300 is described herein with reference to the OLTs 102 of example network environments 100, 200 of FIGS. 1 and 2; however, example process 300 is not limited to the OLTs 102 of the example network environments 100, 200 of FIGS. 1 and 2. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

The OLT 102, or a processor 204 thereof, maps logical identifiers, such as LLIDs, of the PON ports 208A-B to tunnel identifiers (302). In one or more implementations, a host processor or a line card processor may map the logical identifiers of the PON ports 208A-B to the tunnel identifiers. In one or more implementations, the logical identifiers of the PON ports 208A-B may be mapped to the tunnel identifiers when the logical identifiers, and consequently logical identifier indices, are established, such as through a discovery process that may be initiated when an ONU 108 that is connected to the OLT 102 through one of the PON ports 208A-B initiates communication with the OLT 102. The logical identifier indices may be indices that are directly mapped to the logical identifiers.

In one or more implementations, a tunnel identifier may include a logical identifier index of a logical identifier of a PON port 208A, along with an identifier of the PON port 208A. Accordingly, the tunnel identifier may be referred to as being indirectly mapped to the logical identifier, e.g. mapped to the logical identifier through the logical identifier index. In one or more implementations, the tunnel identifier may be 12-bits, and may include 11-bits allocated to the logical identifier index and 1-bit allocated to the identifier of the PON port 208A, such as for OLTs 102 including only two PON ports 208A-B. Alternatively, or in addition, the tunnel identifier may be 12-bits and may include 9-bits allocated to the logical identifier index and 3-bits allocated to the identifier of the PON port 208A, such as for OLTs 102 that include up to eight PON ports 208A-B. For example, in the OLT 102 of FIG. 2, a PON port identifier of 0 may be assigned to the PON port 208A, and a PON port identifier of 1 may be assigned to the PON port 208B. The mapping of the logical identifiers and PON ports 208A-B to the tunnel identifiers are discussed further below with respect to FIG. 6.

The OLT 102, or a processor 204 thereof, such as a host processor or a line card processor, communicates the tunnel identifier to logical identifier mappings to the OLT MAC device 206 and the switch device 202, as necessary, such as through the inband management channel across the interface 210 (304).

The OLT MAC device 206 receives upstream data items over the PON ports 208A-B, such as from the ONUs 108. The upstream data items may be, or may include, data frames, data packets, or generally any stream of segmented data. An upstream data item may include a logical identifier that corresponds to the ONU 108 from which the upstream data item originated. The OLT MAC device 206 obtains the logical identifiers from the upstream data items, retrieves the logical identifier indices mapped to the logical identifiers, and replaces the logical identifiers of the upstream data items with tunnel identifiers that include the logical identifier indices and identifiers of the PON ports 208A-B over which the upstream data items were received (306). For example, the OLT MAC device 206 may append VLAN tags to the upstream data items that include the tunnel identifiers.

The OLT MAC device 206 transmits the upstream data items, including the tunnel identifiers, to the switch device 202, such as over the interface 210 (308). The switch device 202 transmits the upstream data items to the uplink 112, or schedules the upstream data items for transmission to the uplink 112. In one or more implementations, the switch device 202 may perform one or more operations with respect to the upstream data items, such as flow classification, packet forwarding, packet modification, or generally any operations that may be performed by a switch device 202. The switch device 202 may also store a mapping corresponding to the tunnel identifier of an upstream data item and the source of the upstream data item, such as the source IP address, the source MAC address, or generally any information that may be used to identify the source of the upstream data item. In one or more implementations, the mapping may also include other fields, e.g. the switch device 202 may utilize the tunnel identifier and/or one or more VLAN tags, or other fields, to determine forwarding of upstream data items.

The switch device 202 receives downstream data items from the uplink 112. The downstream data items may be, or may include, data frames, data packets, or generally any stream of segmented data. The switch device 202 determines the tunnel identifiers that are mapped to the destinations of the downstream data items, such as the destination IP address, the destination MAC address, or any information that may be used to identify the destination of the downstream data items. In one or more implementations, the switch device 202 may perform one or more packet modification functions on the downstream data items that may result in generating both the tunnel identifiers and other encapsulation, such as one or more VLAN tags and/or other fields. The switch device 202 appends the tunnel identifiers that include the corresponding logical identifiers and the PON ports to the downstream data items (310). In one or more implementations, the switch device 202 may append the tunnel identifiers to the downstream data items in a VLAN tag. In one or more implementations, the switch device 202 may also perform one or more operations with respect to the downstream data items, such as flow classification, packet forwarding, packet modification, or generally any operations that may be performed by a switch device 202.

The switch device 202 transmits the downstream data items, including the tunnel identifiers, to the OLT MAC device 206, such as over the interface 210 (312). The OLT MAC device 206 determines the PON ports 208A-B over which the downstream data items should be transmitted based on the PON port identifiers included in the tunnel identifiers. The OLT MAC device 206 replaces the tunnel identifiers of the downstream data items with the mapped logical identifiers and transmits the downstream data items to the ONUs 108 over the determined PON ports 208A-B.

Figure 4:
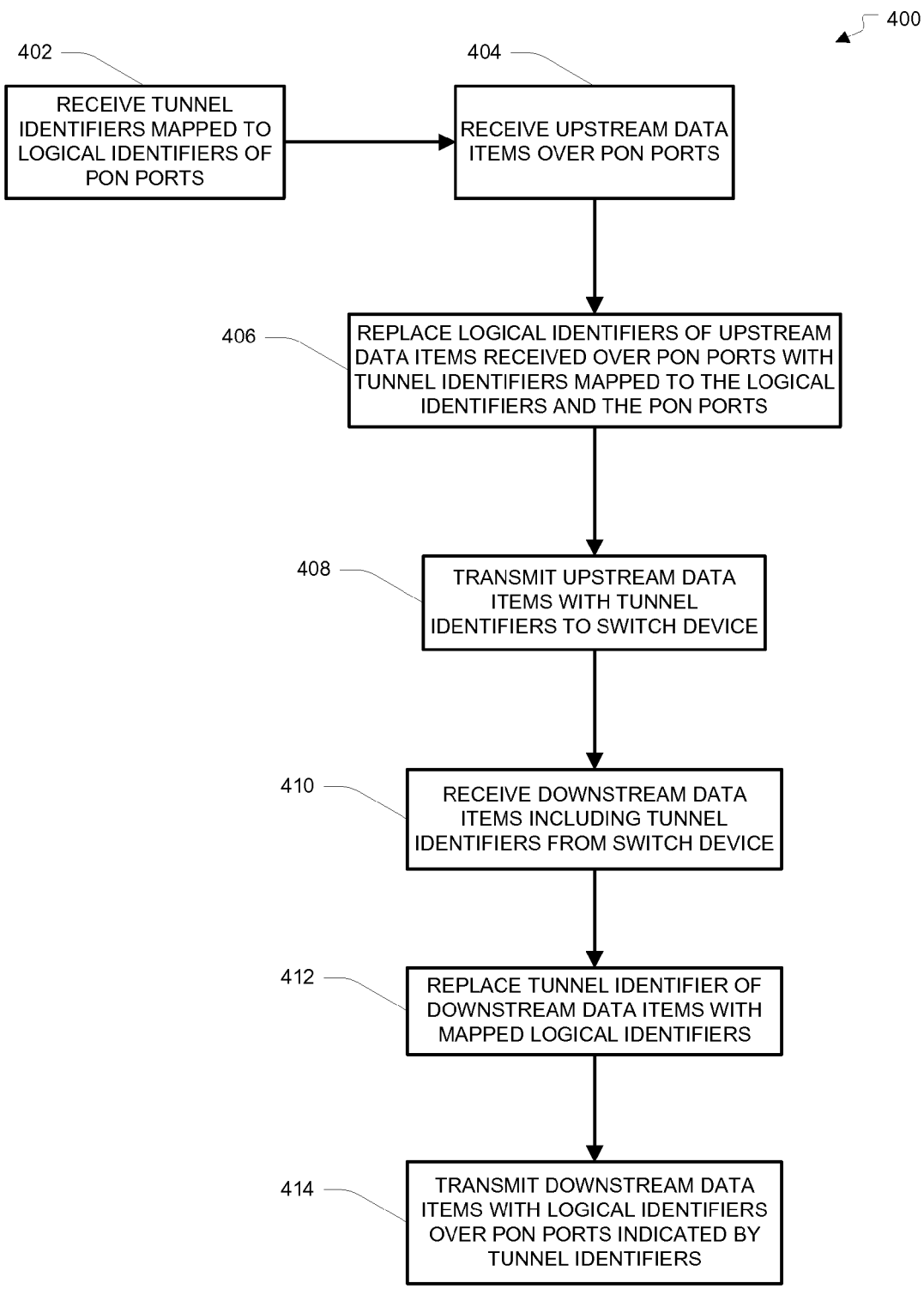
FIG. 4 illustrates a flow diagram of an example process for an OLT MAC device in an optical line terminal system in accordance with one or more implementations.

FIG. 4 illustrates a flow diagram of an example process 400 for an OLT MAC device 206 in an optical line terminal system in accordance with one or more implementations. For explanatory purposes, example process 400 is described herein with reference to the OLTs 102 of the example network environments 100, 200 of FIGS. 1 and 2; however, example process 400 is not limited to the OLTs 102 of the example network environments 100, 200 of FIGS. 1 and 2. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

The OLT MAC device 206 of the OLT 102 receives tunnel identifiers mapped to the logical identifiers of the PON ports 208A-B (402), such as from a line card processor, a host processor, or generally any processor 204 communicatively coupled to the OLT MAC device 206. The OLT MAC device 206 receives upstream data items over the PON ports 208A-B, such as from the ONUs 108 (404). The OLT MAC device 206 replaces the logical identifiers of the upstream data items received over the PON ports 208A-B with the tunnel identifiers that are mapped to the logical identifiers of the PON ports 208A-B (406). In one or more implementations, a tunnel identifier of an upstream data item may include a logical identifier index that is mapped to the logical identifier of the upstream data item, along with an identifier of the PON port 208A-B over which the upstream data item was received.

The OLT MAC device 206 of the OLT 102 transmits the upstream data items that include the tunnel identifiers to the switch device 202 (408), such as over the interface 210. The OLT MAC device 206 of the OLT 102 subsequently receives downstream data items that include tunnel identifiers from the switch device 202 (410), such as over the interface 210. The OLT MAC device 206 determines the PON ports 208A-B over which the downstream data item should be transmitted based on the PON port identifiers of the tunnel identifiers. The OLT MAC device 206 replaces the tunnel identifiers of the downstream data items with the mapped logical identifiers (412), and transmits the downstream data items to the ONUs 108 over the determined PON ports 208A-B (414), such as via the ODN 104.

Figure 5:
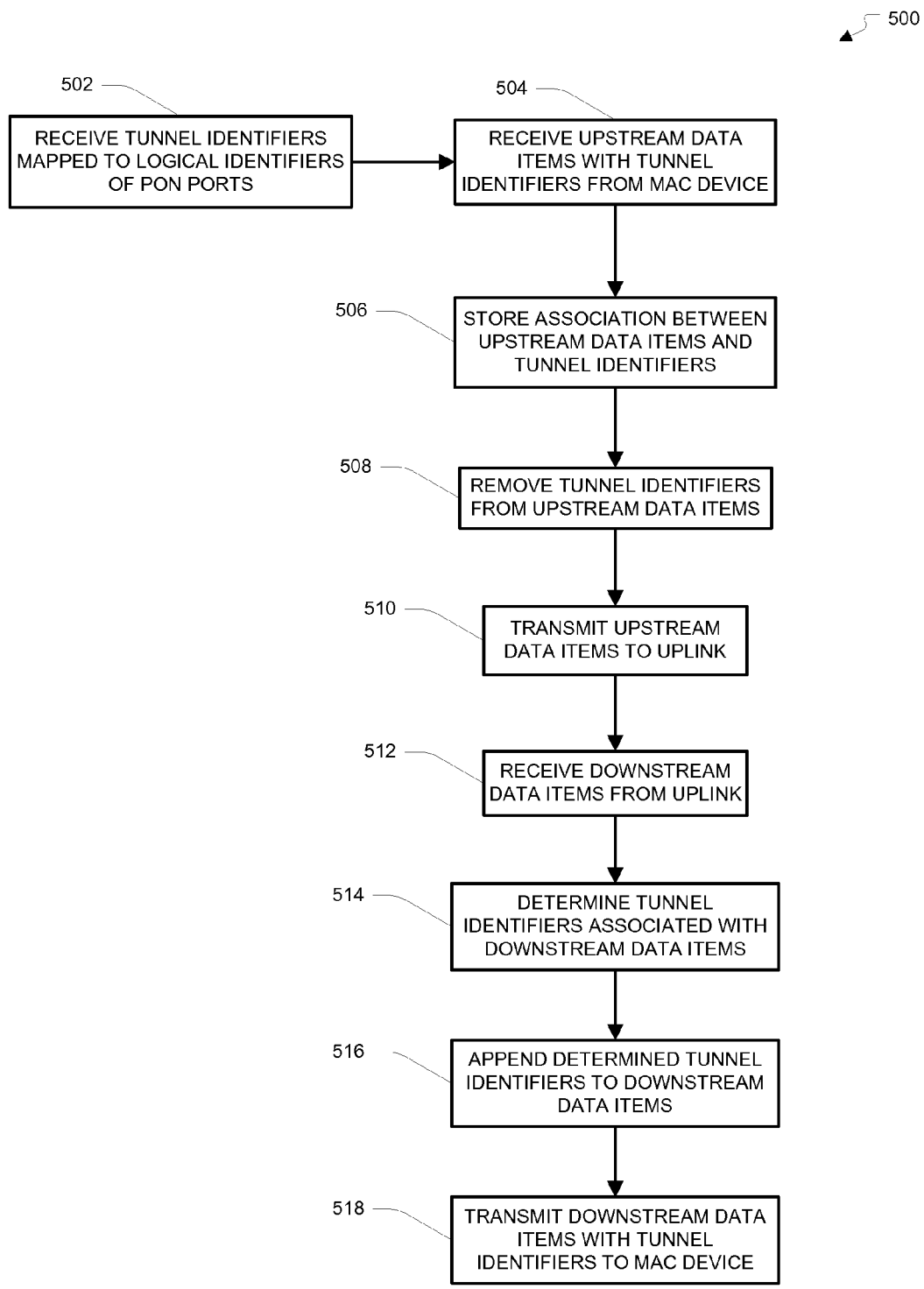
FIG. 5 illustrates a flow diagram of an example process for a switch device in an optical line terminal system in accordance with one or more implementations.

FIG. 5 illustrates a flow diagram of an example process 500 for a switch device 202 in an optical line terminal system in accordance with one or more implementations. For explanatory purposes, example process 500 is described herein with reference to the OLTs 102 of the example network environments 100, 200 of FIGS. 1 and 2; however, example process 500 is not limited to the OLTs 102 of the example network environments 100, 200 of FIGS. 1 and 2. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

The switch device 202 of the OLT 102 receives tunnel identifiers that are mapped to the logical identifiers of the PON ports 208A-B (502), such as from a line card processor, a host processor, or generally any processor 204 communicatively coupled to the switch device 202. In one or more implementations, the switch device 202 may receive the mappings of the tunnel identifiers through the inband management channel across the interface 210. The switch device 202 receives upstream data items that include tunnel identifiers from the OLT MAC device 206, such as across the interface 210 (504). The switch device 202 stores associations between the upstream data items and the tunnel identifiers that are appended to the upstream data items (506). For example, the switch device 202 may store an association between the source IP addresses and/or the source MAC addresses and the tunnel identifiers. In one or more implementations, it may be optional for the switch device 202 to store the associations between the upstream data items and the tunnel identifiers (506). Alternatively, or in addition, the associations between the upstream data items and the tunnel identifiers may be configured.

The switch device 202 removes the tunnel identifiers from the upstream data items (508). In one or more implementations, the switch device 202 may further process the upstream data items, such as by performing additional encapsulation changes with respect to the upstream data items. The switch device 202 transmits the upstream data items to the uplink 112 (510). The switch device 202 receives downstream data items from the uplink 112 (512). The switch device 202 determines the tunnel identifiers associated with the downstream data items (514), such as by identifying a stored mapping between the destination IP addresses and/or the destination MAC addresses of the downstream data items. The switch device 202 appends the determined tunnel identifiers to the downstream data items (516), such as by appending VLAN tags to the downstream data items that include the determined tunnel identifiers. In one or more implementations, the switch device 202 may further process the downstream data items, such as by performing additional encapsulation changes with respect to the downstream data items. The switch device 202 transmits the downstream data items with the appended tunnel identifiers to the OLT MAC device 206, such as over the interface 210 (518).

Figure 6:
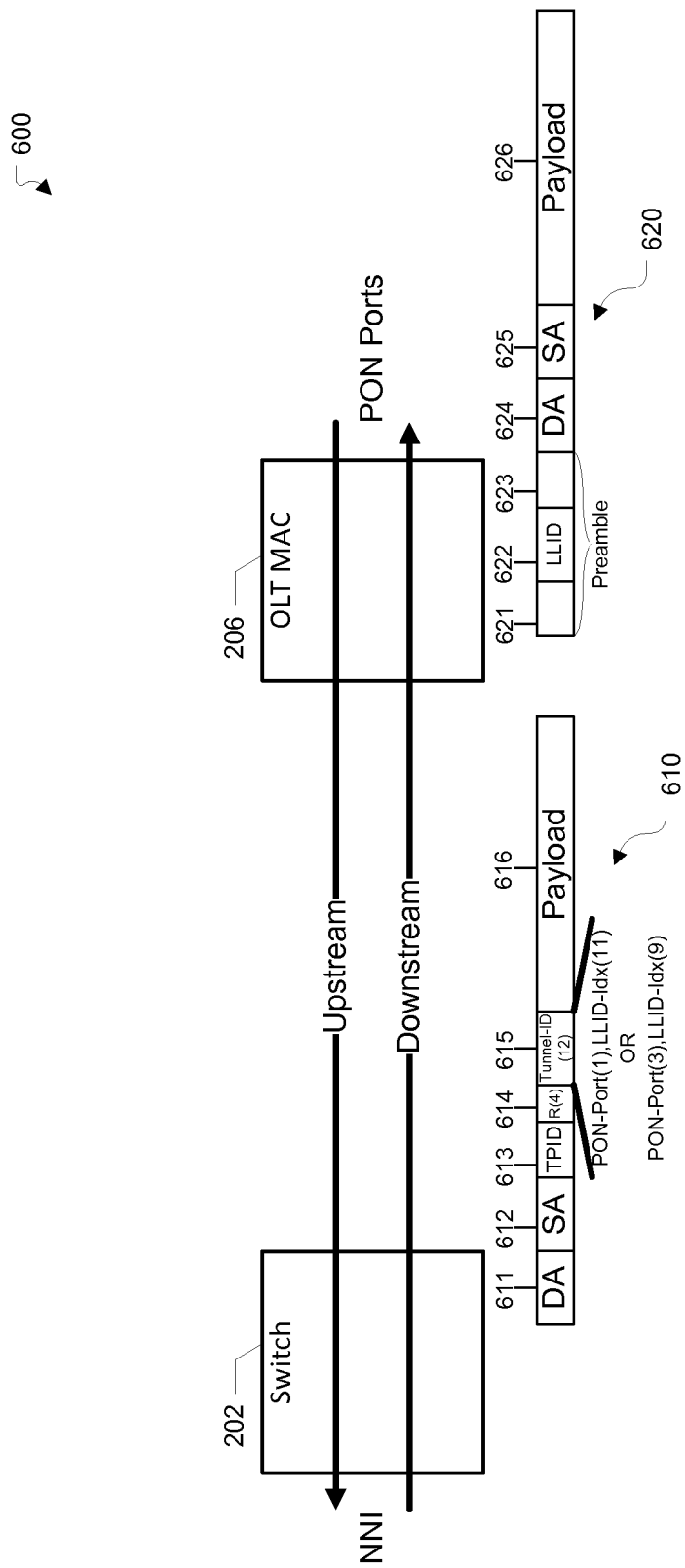
FIG. 6 illustrates an example data flow in an optical line terminal system in accordance with one or more implementations.

FIG. 6 illustrates an example data flow 600 in an optical line terminal system in accordance with one or more implementations. For explanatory purposes, example data flow 600 is described herein with reference to the OLTs 102 of the example network environments 100, 200 of FIGS. 1 and 2. However, example data flow 600 is not limited to the OLTs 102 of the example network environments 100, 200 of FIGS. 1 and 2. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The data flow 600 includes a first format 610 for data being transmitted to/from the OLT MAC device 206 and the switch device 202, and a second format 620 for data being transmitted from the OLT MAC device 206 over the PON ports 208A-B to the ONUs 108. The first format 610 includes a DA field 611 that may include a destination address, a SA field 612 that may include a source address, a TPID field 613 that may include an EtherType identifier, a header field 614 that may include various header information, a tunnel ID field 615 that may include an example tunnel identifier as described herein, and a payload 616 that may include the underlying data being transmitted. In one or more implementations, the format of the tunnel identifier stored in the tunnel ID field 615 may vary based on the PON supported by the OLT MAC device 206, e.g. the OLT MAC device 206 may support multiple separate ODNs 104, such as four separate ODNs 104 that are each capable of 2G speed, or 1G/2G dual-speed.

The second format 620 includes preamble fields 621, 623 that may include preamble information, an LLID field 622 that may include the logical link identifier, a destination address field 624 that may include the destination address, a source address field 625 that may include the source address, and a payload 626 that may include the underlying data being transmitted.

Figure 7:
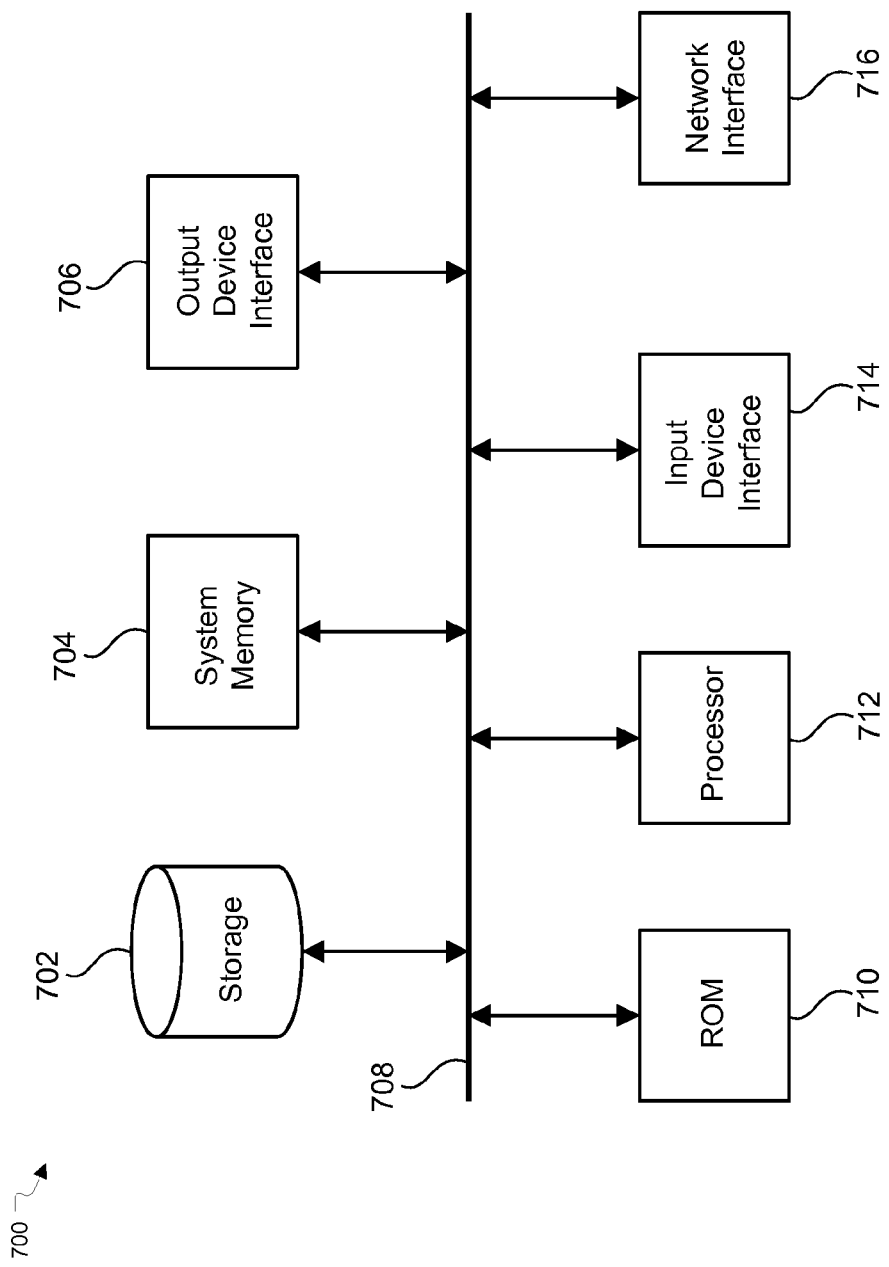
FIG. 7 conceptually illustrates an electronic system with which any implementations of the subject technology may be implemented.

FIG. 7 conceptually illustrates electronic system 700 with which any implementations of the subject technology are implemented. Electronic system 700, for example, can be a desktop computer, a laptop computer, a tablet computer, a server, a switch, a router, a base station, a receiver, a phone, a personal digital assistant (PDA), any device that can be implemented in an optical line terminal system, or generally any electronic device that transmits signals over a network. Such an electronic system includes various types of computer readable media and interfaces for various other types of computer readable media. Electronic system 700 includes bus 708, processing unit(s) 712, system memory 704, read-only memory (ROM) 710, permanent storage device 702, input device interface 714, output device interface 706, and network interface 716, or subsets and variations thereof.

Bus 708 collectively represents all system, peripheral, and chipset buses that communicatively connect the numerous internal devices of electronic system 700. In one or more implementations, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. One or more implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores any of the instructions and data that processing unit(s) 712 needs at runtime. In one or more implementations, the processes of the subject disclosure are stored in system memory 704, permanent storage device 702, and/or ROM 710. From these various memory units, processing unit(s) 712 retrieves instructions to execute and data to process in order to execute the processes of one or more implementations.

Bus 708 also connects to input and output device interfaces 714 and 706. Input device interface 714 enables a user to communicate information and select commands to the electronic system. Input devices used with input device interface 714 include, for example, alphanumeric keyboards and pointing devices (also called "cursor control devices"). Output device interface 706 enables, for example, the display of images generated by electronic system 700. Output devices used with output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, bus 708 also couples electronic system 700 to a network (not shown) through network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Terms such as "top," "bottom," "front," "rear" and the like as used in this disclosure, if any, should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for providing an optical line terminal (OLT) system for a passive optical network (PON), the method comprising:
    mapping a plurality of logical identifiers of each of a plurality of PON ports to a plurality of tunnel identifiers, wherein each of the plurality of tunnel identifiers comprises a concatenation of a PON port identifier of the mapped PON port of the plurality of PON ports and a logical identifier index generated from the mapped logical identifier of the plurality of logical identifiers, and the OLT system is coupled to a plurality of optical network units via the plurality of PON ports, the OLT system being coupled to at least two of the plurality of optical network units via at least one of the plurality of PON ports;
    receiving, by a first device, a plurality of upstream data items over the plurality of PON ports, wherein each of the plurality of upstream data items comprises one of the plurality of logical identifiers;
    replacing, by the first device, each of the plurality of logical identifiers of each of the plurality of upstream data items received over each of the plurality of PON ports with each of the plurality of tunnel identifiers mapped to each of the plurality of logical identifiers of each of the plurality of PON ports; and
    transmitting, by the first device, each of the plurality of upstream data items comprising each of the plurality of tunnel identifiers.

2. The method of claim 1, further comprising:
    receiving, by a second device and from the first device, each of the plurality of upstream data items comprising each of the plurality of tunnel identifiers;
    removing, by the second device, each of the plurality of tunnel identifiers from each of the plurality of upstream data items; and
    transmitting, by the second device, each of the plurality of upstream data items to a network.

3. The method of claim 2, wherein the first device comprises an OLT Medium Access Control (MAC) device and the second device comprises a switch device.

4. The method of claim 3, wherein the OLT MAC device and the switch device are on separate integrated circuits (ICs).

5. The method of claim 4, wherein the OLT MAC device and the switch device are on separate line cards.

6. The method of claim 3, wherein transmitting, by the first device, each of the plurality of upstream data items comprising each of the plurality of tunnel identifiers further comprises transmitting, by the OLT MAC device over an Ethernet interface to the switch device, each of the plurality of upstream data items comprising each of the plurality of tunnel identifiers.

7. The method of claim 3, wherein the switch device performs at least one of: flow classification, packet forwarding, packet modification, per flow queuing with deep packet buffer, or downstream bandwidth scheduling with multiple levels of hierarchy, and the OLT MAC device performs at least one of: an EPON interface function, EPON upstream bandwidth scheduling towards the switch device with multiple levels of hierarchy, an EPON diagnostic function, or termination of EPON discovery.

8. The method of claim 2, further comprising
    receiving, by the second device, a plurality of downstream data items from the network;
    determining, by the second device, each of the plurality of tunnel identifiers that correspond to each of the plurality of downstream data items;

appending, by the second device, each of the determined plurality of tunnel identifiers to each of the plurality of downstream data items;

transmitting, by the second device and to the first device, each of the plurality of downstream data items including each of the plurality of tunnel identifiers;

receiving, by the second device, each of the plurality of downstream data items including each of the plurality of tunnel identifiers;

replacing, by the second device, each of the plurality of tunnel identifiers of each of the plurality of downstream data items with each of the plurality of logical identifiers mapped to each of the plurality of tunnel identifiers; and transmitting, by the second device, each of the plurality of downstream data items including each of the plurality of logical identifiers over each of the plurality of PON ports identified by each of the plurality of tunnel identifiers.

9. The method of claim 8, wherein the appending, by the second device, each of the determined plurality of tunnel identifiers to each of the plurality of downstream data items further comprises appending, by the second device, each of a plurality of tags comprising each of the determined plurality of tunnel identifiers to each of the plurality of downstream data items.

10. The method of claim 1, wherein the plurality of logical identifiers comprise a plurality of link logical identifiers (LLIDs).

11. The method of claim 1, wherein the PON comprises at least one of an Ethernet PON (EPON) or a Gigabit PON (GPON).

12. The method of claim 1, wherein one of the plurality of PON ports supports a maximum data rate of 10 gigabits per second and another of the plurality of PON ports supports a maximum data rate of 1 gigabit per second, or each of the plurality of PON ports supports a maximum data rate of 1 gigabit per second.

13. The method of claim 1, wherein the replacing, by the first device, each of the plurality of logical identifiers of each of the plurality of upstream data items received over each of the plurality of PON ports with each of the plurality of tunnel identifiers mapped to each of the plurality of logical identifiers of each of the plurality of PON ports further comprises:

removing, by the first device, each of the plurality of logical identifiers of each of the plurality of upstream data items received over each of the plurality of PON ports; and encoding, by the first device, each of the plurality of tunnel identifiers into each of a plurality of tags; and appending, by the first device, each of the plurality of tags to each of the plurality of upstream data items corresponding to each of the plurality of logical identifiers of each of the plurality of PON ports mapped to each of the plurality of tunnel identifiers encoded into each of the plurality of tags.

14. The method of claim 13, wherein one of the plurality of tags comprises an outer virtual local area network (VLAN) tag.

15. The method of claim 1, wherein the mapping the plurality of logical identifiers of each of the plurality of PON ports to the plurality of tunnel identifiers further comprises:

generating the logical identifier index for each of the plurality of logical identifiers of each of the plurality of PON ports; and generating each of the plurality of tunnel identifiers by concatenating the PON port identifier of each of the plurality of PON ports and the logical identifier index of each of the plurality of logical identifiers of each of the plurality of PON ports.

16. A non-transitory machine-readable medium embodying instructions that, when executed by a machine, allow the machine to perform a method for providing an optical line terminal (OLT) system for a passive optical network (PON), the method comprising:

mapping a plurality of logical identifiers of each of a plurality of PON ports to a plurality of tunnel identifiers, wherein each of the plurality of tunnel identifiers comprises a concatenation of a PON port identifier of the mapped PON port of the plurality of PON ports and a logical identifier index generated from the mapped logical identifier of the plurality of logical identifiers, and the OLT system is coupled to a plurality of optical network units via the plurality of PON ports, the OLT system being coupled to at least two of the plurality of optical network units via at least one of the plurality of PON ports;

receiving, by a first device, a downstream data item from a network;

determining, by the first device, one of the plurality of tunnel identifiers that corresponds to the downstream data item;

appending, by the first device, the one of the plurality of tunnel identifiers to the downstream data item; and transmitting, by the first device over an Ethernet interface to a second device, the downstream data item including the appended one of the plurality of tunnel identifiers.

17. The non-transitory machine-readable medium of claim 16, wherein the method further comprises:

receiving, by the second device, the downstream data item including the one of the plurality of tunnel identifiers;

replacing, by the second device, the one of the plurality of tunnel identifiers of the downstream data item with the logical identifier of the plurality of logical identifiers that is mapped to the one of the plurality of tunnel identifiers; and transmitting, by the second device, the downstream data item including the logical identifier over the PON port identified by the one of the plurality of tunnel identifiers.

18. The non-transitory machine-readable medium of claim 17, wherein the first device comprises a switch device and the second device comprises an OLT Medium Access Control (MAC) device.

19. An optical line terminal (OLT) system for a passive optical network (PON), the system comprising:

a processor that is communicatively coupled to an OLT Medium Access Control (MAC) device and a switch device, wherein the processor is operative to:

map a plurality of logical identifiers of each of a plurality of PON ports to a plurality of tunnel identifiers, wherein each of the plurality of tunnel identifiers comprises a concatenation of a PON port identifier of the mapped PON port of the plurality of PON ports and a logical identifier index generated from the mapped logical identifier of the plurality of logical identifiers, and the OLT system is coupled to a plurality of optical network units via the plurality of PON ports, the OLT system being coupled to at least two of the plurality of optical network units via at least one of the plurality of PON ports;

the switch device, wherein the switch device is communicatively coupled to the OLT MAC device via an Ethernet interface; and the OLT MAC device, wherein the OLT MAC device is communicatively coupled to the plurality of PON ports and the OLT MAC is operative to:

receive a plurality of upstream data items over each of the plurality of PON ports, wherein each of the plurality of upstream data items comprises one of the plurality of logical identifiers;

replace each of the plurality of logical identifiers of each of the plurality of upstream data items received over each of the plurality of PON ports with each of the plurality of tunnel identifiers mapped to each of the plurality of logical identifiers of each of the plurality of PON ports; and transmitting, over the Ethernet interface to the switch device, each of the plurality of upstream data items comprising each of the plurality of tunnel identifiers.

20. The system of claim 19, wherein the switch device is operative to:

receive each of the plurality of upstream data items comprising each of the plurality of tunnel identifiers;

remove each of the plurality of tunnel identifiers from each of the plurality of upstream data items; and transmit each of the plurality of upstream data items to a network.

* * * * *